United States Patent [19]

Mori et al.

[11] Patent Number: 4,635,065
[45] Date of Patent: Jan. 6, 1987

[54] ANTENNA DEVICE FOR DIRECTION FINDERS

[75] Inventors: Kenzo Mori; Hyo Yasuda, both of Tokyo; Minoru Suzuki, Yamato, all of Japan

[73] Assignee: Taiyo Musen Co. Ltd., Tokyo, Japan

[21] Appl. No.: 636,218

[22] Filed: Jul. 31, 1984

[30] Foreign Application Priority Data

Jan. 13, 1984 [JP] Japan ................................. 59-3520

[51] Int. Cl.[4] ................................................ G01S 5/04
[52] U.S. Cl. .............................. 342/435; 343/700 MS;
343/846; 342/429
[58] Field of Search ............... 343/429, 432, 433, 435,
343/436, 700 MS, 846, 908

[56] References Cited

U.S. PATENT DOCUMENTS 4,358,768 11/1982 Ernst et al. ........................... 343/429
4,510,498 4/1985 Mori et al. ........................... 343/435

Primary Examiner—Theodore M. Blum
Assistant Examiner—Mark Hellner
Attorney, Agent, or Firm—A. W. Breiner

[57] ABSTRACT

An antenna device for a direction finder includes a substantially grounded conductive base plate, a plurality of web-shaped antenna elements mounted in spaced relation on the base plate and having central portions extending in crisscross relation and insulated from each other, an electronic switching circuit for alternately grounding ends of the antenna elements and picking up reception outputs from opposite ends of the antenna elements at a constant period with the antenna elements being switched out of phase at an angle corresponding to the angle at which the antenna elements extend across each other, and a circuit for combining outputs from the antenna elements. According to another embodiment, the antenna elements comprise the web-shaped antenna elements and a vertical antenna element disposed substantially centrally in the web-shaped antenna elements.

4 Claims, 12 Drawing Figures

FIG. 10
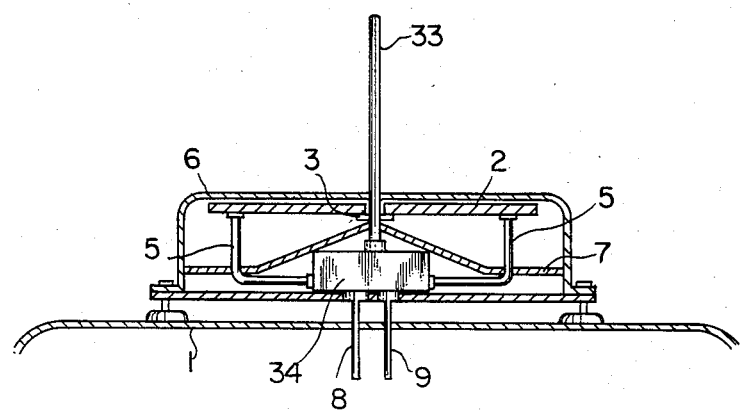
FIG. 12 A
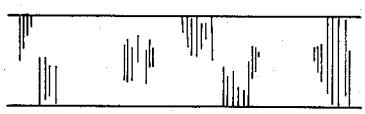
FIG. 12 B
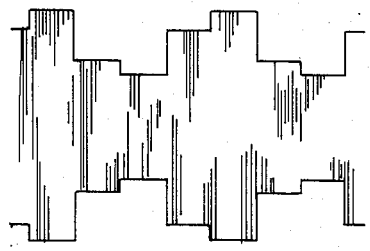
FIG. 12 C
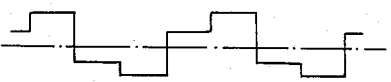
FIG. 12 D
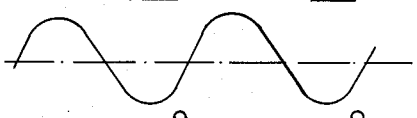
FIG. 12 E
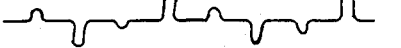
FIG. 12 F

ANTENNA DEVICE FOR DIRECTION FINDERS

BACKGROUND OF THE INVENTION

The present invention relates to an antenna device for direction finders which has a plurality of antenna elements and a switching circuit for rotating the directivity of the antenna device.

Where an antenna placed horizontally above ground has one end grounded with the other end used to produce a received output signal, the antenna exhibits sensitivity characteristics in the pattern of a cardioid diagram as the direction in which a wave arrives varies. Such an antenna may be employed to provide a direction finder. However, conventional directional finders have been complex in arrangement since it has been necessary to rotate the antenna mechanically or provide a number of antennas oriented in various directions, and to compare output signals from such antennas.

SUMMARY OF THE INVENTION

It is an object of the present invention to provide an antenna device having a plurality of antennas capable of gaining a high sensitivity without any mechanically movable components employed.

According to the present invention, an antenna device for a direction finder includes a substantially grounded conductive base plate, a plurality of web-shaped antenna elements mounted in spaced relation on the base plate and having central portions extending in crisscross relation and insulated from each other, an electronic switching circuit for alternately grounding ends of the antenna elements and picking up reception outputs from opposite ends of the antenna elements at a constant period with the antenna elements being switched out of phase at an angle corresponding to the angle at which the antenna elements extend across each other, and a circuit for combining outputs from the antenna elements. According to another embodiment, the antenna elements comprise the web-shaped antenna elements and a vertical antenna element disposed substantially centrally in the web-shaped antenna elements.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 10 is a vertical cross-sectional view of an antenna device according to a second embodiment of the present invention;

FIG. 12 is a diagram showing waveform illustrative of operation of the antenna device of FIG. 11.

DESCRIPTION OF THE PREFERRED EMBODIMENTS

Figure 1:
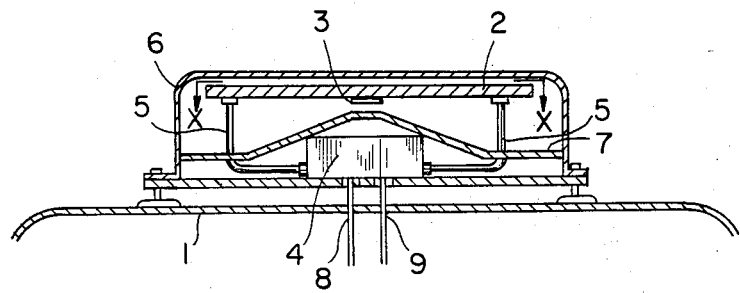
FIG. 1 is a vertical cross-sectional view of an antenna device according to a first embodiment of the present invention.

FIG. 1 shows an antenna device constructed in accordance with a first embodiment of the present invention. The antenna device includes a conductive base plate 1 composed of an airplane fuselage or an automobile roof, for example, and a pair of web-shaped antenna elements 2, 3 extending in crisscross relation to each other and mounted on the base plate 1 in spaced relation thereto. The base plate 1 is sufficiently large as compared with the antenna elements 2, 3 and can be regarded as a conductive plate which is substantially grounded. The antenna device also includes a casing 4 attached to the upper surface of the base plate 1. The ends of the antenna elements 2, 3 are connected by coaxial cables 5 to an electronic switching circuit disposed in the casing 4. The antenna elements 2, 3 are covered with an insulative cover 6.

Figure 2:
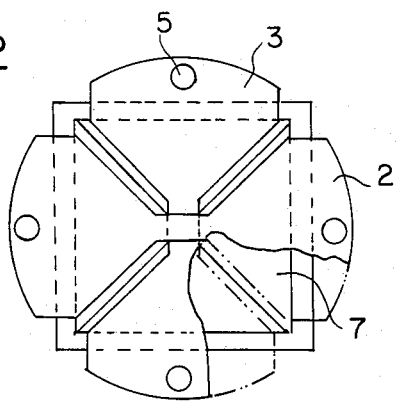
FIG. 2 is a plan view taken along line X—X of FIG. 1.

As illustrated in FIG. 2, the antenna elements 2, 3 are progressively increased in width toward their opposite ends with central narrower portions extending across each other in spaced relation. A conductive plate 7 in the form of a corn is disposed between the antenna elements 2, 3 and the casing 4 and connected to the base plate 1. The distance from the conductive plate 7 to the antenna elements 2, 3 is therefore increased as the widths of the antenna elements 2, 3 increase, so that the characteristic impedances of the antenna elements 2, 3 will remain substantially constant regardless of the position thereon. An output signal from the electronic switching circuit in the casing 4 is led through a coaxial cable 8 to a direction finder proper. The electronic switching circuit is supplied with a switching signal through a two-core cable 9.

Figure 3:
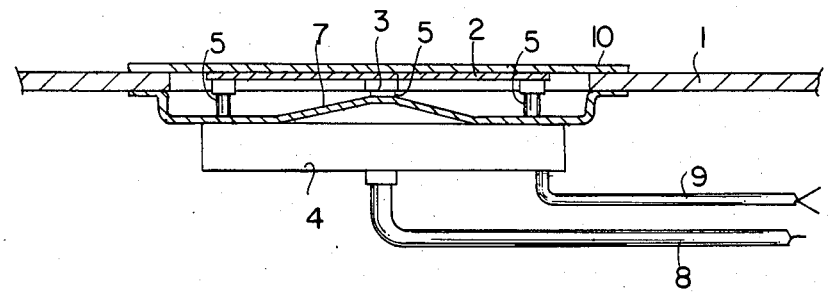
FIG. 3 is a vertical cross-sectional view of an antenna device according to a modification of the present invention.

FIG. 3 shows a modified antenna device. A conductive base plate 1 has a circular hole closed by an insulative plate 10 to which web-shaped antenna elements 2, 3 are attached. A conductive plate 7 having a central corn projection is disposed in confronting relation to the web-shaped antenna elements 2, 3, the conductive plate 7 being peripherally connected to the base plate 1. Therefore, the antenna elements 2, 3 have characteristic impedances which remain substantially constant as with the antenna elements 2, 3 shown in FIGS. 1 and 2. With the arrangement shown in FIG. 3, the antenna device does not appear on the outer surface of the airplane fuselage or automobile roof.

Figure 4:
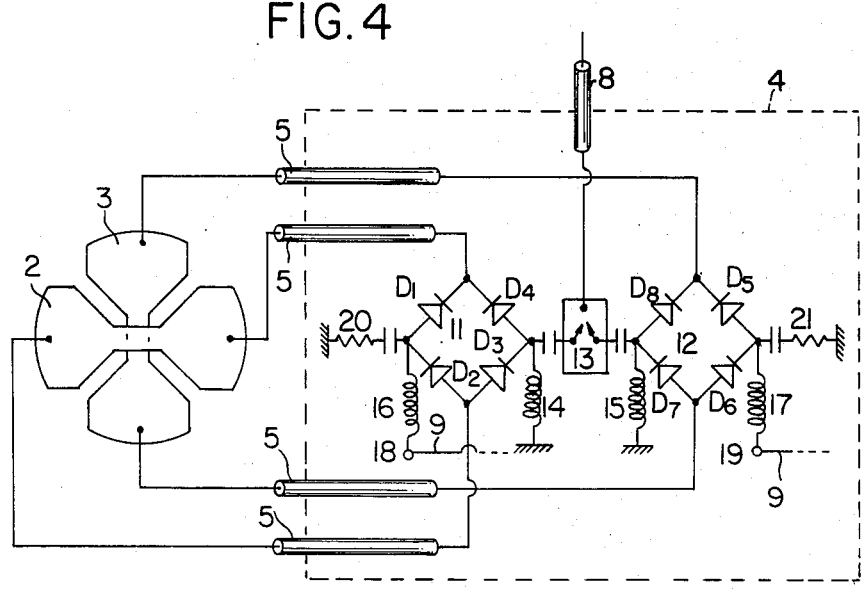
FIG. 4 is a circuit diagram of an electronic switching circuit for the antennas.

FIG. 4 is illustrative of the antenna elements 2, 3 and an electronic switching circuit disposed in the casing 4. The electronic switching circuit includes bridge circuits 11, 12 composed of diodes $D_1$ through $D_4$ and $D_5$ through $D_8$, respectively, which have polarities as shown, the bridge circuits 11, 12 being connected to the ends of the antenna elements 2, 3. Antenna output signals led from junctions between the diodes $D_3$, $D_4$ and the diodes $D_7$, $D_8$ are combined by an adder 13 into a composite signal which is transmitted by the coaxial cable 8 to the direction finder proper, the diode junctions being grounded through high-frequency blocking coils 14, 15. Junctions between the diodes $D_1$, $D_2$ and the diodes $D_5$, $D_6$ are connected through high-frequency blocking coils 16, 17 to terminals 18, 19 of the two-core cable 9. These junctions are also connected to ground through DC blocking capacitors and resistors 20, 21 having impedances equal to the characteristic impedances of the antenna elements 2, 3. When switching control square-wave voltages of a few hundred hertz, for example, which are 90° out of phase with each other as shown in FIG. 5 at A and B, the phase angle being equal to the angle of intersection of the antenna elements 2, 3, are applied to the terminals 18, 19 via the cable 9, the diodes $D_1$, $D_3$, $D_6$, $D_8$ are rendered conductive while the other diodes nonconductive in a period a, thus forming the circuit shown in FIG. 6.

Figure 5:
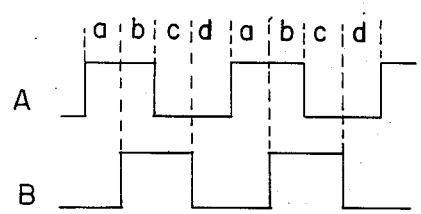
FIG. 5 is a diagram showing the waveforms of voltages applied to cable terminals in the electronic switching circuit shown in FIG. 4.
Figure 6:
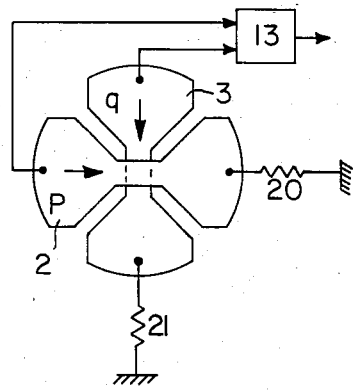
FIG. 6 is a circuit diagram of an antenna circuit formed during a period a in one cycle of operation.
Figure 7:
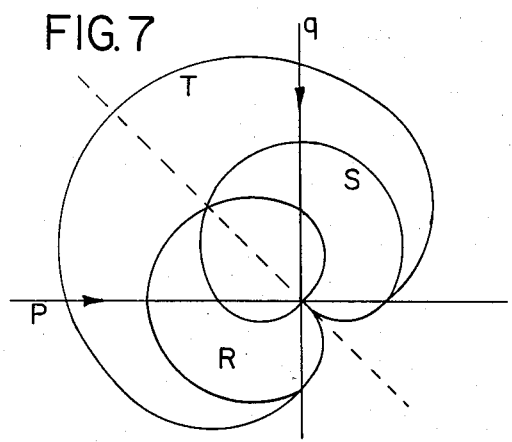
FIG. 7 is a diagram showing the directivity pattern of the antenna as illustrated in FIG. 6.

In the circuit of FIG. 6, the antenna elements 2, 3 produce maximum outputs when waves are received in the directions of the arrows p, q and zero outputs when waves are received in opposite directions. The antenna elements 2, 3 have directivity characteristics in the patterns of cardioid diagrams R, S as shown in FIG. 7, and hence a composite output from the adder 13 is indicative of a directivity in the pattern of a cardioid diagram T which is a combination of the cardioid diagrams R, S. In a period b of FIG. 5, the diodes $D_1$, $D_3$, $D_5$, $D_7$ are rendered conductive while the other diodes nonconductive. In this period b, therefore, the diagram R remains unchanged, but the diagram S is vertically inverted with the resultant composite directivity characteristic being obtained by turning the diagram T counterclockwise through 90°. In a period c, the diodes $D_2$, $D_4$, $D_5$, $D_7$ are rendered conductive while the other diodes nonconductive. The diagram R is then horizontally inverted, and the composite directivity characteristic is obtained by turning the diagram T through 180°. In a period d, the composite directivity characteristic is obtained by further turning the diagram T counterclockwise through 90°. Accordingly, directivity characteristics in the patterns of cardioid diagrams T, U, V, W as shown in FIG. 8 are obtained in the periods a, b, c, d, of FIG. 5.

Figure 8:
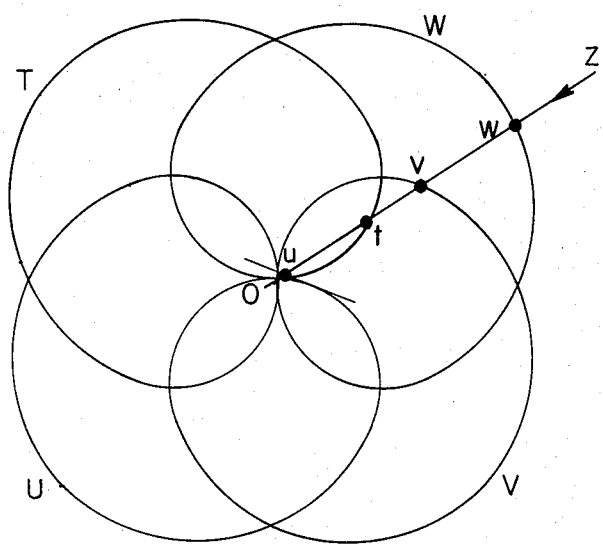
FIG. 8 is a diagram showing the overall directivity pattern of the antenna during all periods a, b, c, d in one cycle of operation.
Figure 9:
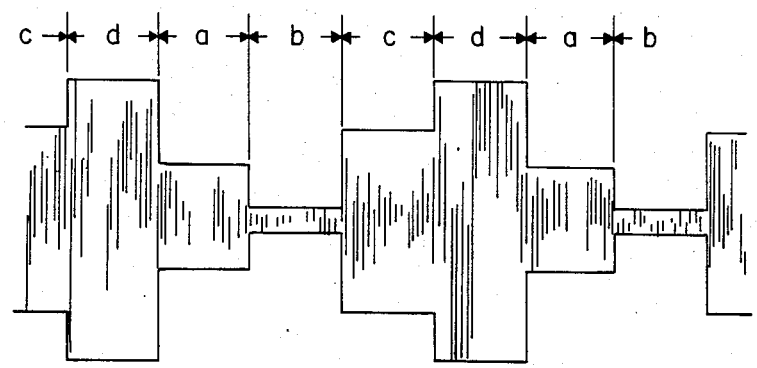
FIG. 9 is a diagram illustrative of the waveform of an output generated from the antenna when a wave is arriving in the direction of the arrow Z.

When a wave enters in the direction of the arrow Z in FIG. 8, outputs having magnitudes corresponding to 0-t, 0-u, 0-v, 0-w are issued from the adder 13 through the cable 8 to the direction finder proper in the periods a, b, c, d, respectively, of FIG. 5. FIG. 9 shows the waveform of such an antenna output. By monitoring a staircase waveform obtained by demodulating the high-frequency antenna output signal or extracting a signal component having the same frequency as that of the control voltages shown in FIG. 5 at A and B and measuring the phase of the signal component, the direction in which the wave enters such as shown by the arrow Z in FIG. 8 can be determined.

In the above embodiment, the two antenna elements are disposed in crisscross relation and the directivity is rotated in increments of 90°. With such an arrangement, there may be generated an octant error dependent on the relationship of the length of the antenna elements and the wavelength of the received wave. Where four antenna elements are used and angularly spaced at angular intervals of 45°, however, the octant error is cancelled out and only a small sexadecimal error remains so that highly accurate direction measurement can be effected in a wider frequency range.

According to a second embodiment, there is provided an antenna device capable of highly accurately finding the direction in which a wave is received in occasions where the wave is weak and the measuring error is increased due to noise components or the wave is received intermittently and the AGC operation of the receiver circuit does not function completely.

FIG. 10 is a vertical cross-sectional view of an antenna device according to the second embodiment of the invention. The second embodiment is exactly the same as the embodiment shown in FIG. 1, which includes a sufficiently large and horizontal conductive plate 1 composed of an airplane fuslage or automobile body which is substantially ground and a pair of web-shaped antenna elements 2, 3 extending in crisscross relation to each other and mounted on the base plate 1. In the second embodiment a single vertical antenna element 33 is disposed centrally in the web-shaped antenna elements 2, 3. An electronic switching unit 34 composed of diodes or transistors is mounted on the reverse side of the above-mentioned conductive plate 7, for example. The vertical antenna element 33 and respective apexes $2_1$, $2_2$ and $3_1$ and $3_2$ of the web-shaped antenna elements 2 and 3, that is, the four corners thereof if it is of a point-symmetry shape such as a square, are connected by a coaxial cable 5 to the electronic switching unit 34. An output signal from the electronic switching unit 34 is led via coaxial cable 8 to a receiver. The electronic switching unit 34 is supplied with a switching control signal from a receiver through the two-core cable 9.

Figure 11:
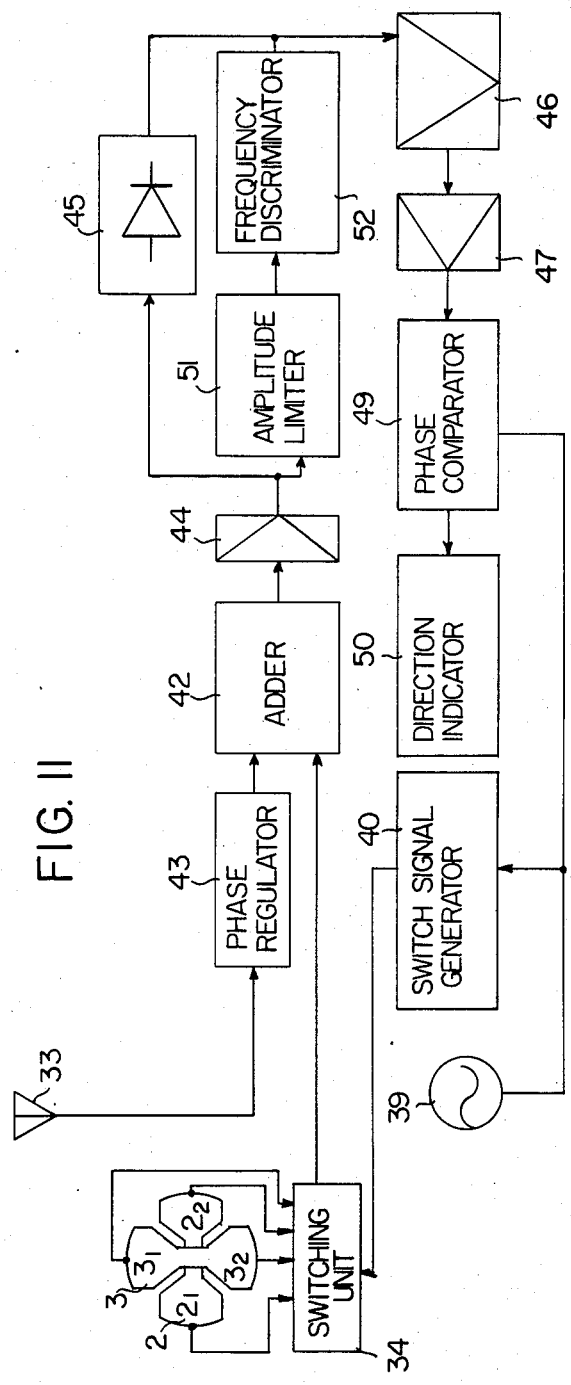
FIG. 11 is a block diagram of the antenna device of FIG. 10.

FIG. 11 shows the web-shaped antenna element 2, 3 the vertical antenna element 33, the switching unit 34, and the receiver. An output signal from a reference low-frequency oscillator 39 is applied to a switching signal generator 40 which produces a square-wave control signal to control the electronic circuit of the switching unit 34 for grounding one of diagonally opposite corners $3_1$, $3_2$ or corners $2_1$, $2_2$ of the antenna elements 2, 3 via resistors (see FIG. 6) having an impedance equal to the characteristic impedance of the antenna elements 2, 3 and for leading an output signal from the other corner and an output signal from the vertical antenna element 33 to the receiver through the cables 8, 9. Such operation is equivalent to intermittent rotation of a pair of movable contacts in a rotatable changeover switch unit 34 in the one direction in increments of 90°. The switch unit makes one revolusion in each cycle of the output from the oscillator 39. Where the output pickup corners or points of the web-shaped antenna elements 2, 3 are switched by the switching unit 34, the directivity characteristic diagram or pattern varies in the same manner as shown in FIG. 8. More specifically, when an output is picked up from the corner $3_1$, a directivity having the pattern of the cardioid diagram T is obtained. By switching the corners of the antenna elements 2, 3 with the switching unit 34, the directivity pattern varies from T to U to V to W. If the wave is received in the direction of the arrow Z, then the output from the web-shaped antenna elements 2, 3 varies from 0-t to 0-u to 0-v to 0-w. FIG. 12 shows at A the waveform of such an output from the web-shaped antenna elements 2, 3. Since the vertical antenna element 33 is nondirectional, its output has a constant amplitude as illustrated in FIG. 12 at B.

As shown in FIG. 11, the output from the web-shaped antenna elements 2, 3 is directly applied to an adder 42, and the output from the vertical antenna element 33 is applied to the adder 42 via a phase regulator 43. By regulating the phase of the output from the vertical antenna element 33 so that the outputs from the vertical antenna element 33 and the web-shaped antenna elements 2, 3 are in phase with each other, the waveform of an output from the adder 42 has its high-frequency component increased in amplitude as shown in FIG. 12 at C. The output from the adder 42 is amplified by an amplifier 44, and the amplified output is applied to a detector 45 which produces a low-frequency signal as shown in FIG. 12 at D. The low-frequency signal is applied to a bandpass filter 46 which extracts a sine wave having the same frequency as that of the output from the oscillator 39 as shown in FIG. 12 at E. The sine wave and the output from the oscillator 39 are applied through a low-frequency amplifier 47 to a phase comparator 49. The sine wave shown in FIG. 12 at E corresponds in phase to the staircase wave as shown in FIG. 12 at A. Since the waveform of the staircase wave is determined by the direction in which the wave is received as indicated by the arrow Z in FIG. 8, the direction in which the wave is received can be recognized by applying an output from the phase comparator 49 to a direction indicator 50.

By controlling the phase regulator 43 so that the outputs from the vertical antenna element 33 and web-shaped antenna elements 2, 3 will be 90° out of phase with each other, the phase of the output from the adder 42 varies with the amplitude of the output from the web-shaped antenna elements 2, 3 as shown in FIG. 12 at A. By amplifying the output from the adder 42 with the amplifier 44, limiting the amplified output to a certain amplitude with an amplitude limiter 51, and applying the limited output to a frequency discriminator 52, there is produced a pulse wave as shown in FIG. 12 at F. Accordingly, the phase of the output from the adder 42 varies dependent on the varying output from the web-shaped antenna elements 2, 3, and the signal frequency increases or decreases as the phase changes. The pulse signal as shown in FIG. 12 at F is generated from the frequency discriminator 52, and a sine wave having the same frequency as that of the output from the oscillator 39 is extracted by the bandpass filter 46. Since the phase of the sine wave is determined by the waveform of the pulse signal, that is, the direction in which the wave is received, that direction can be known by amplifying the output from the bandpass filter 46 with the amplifier 47, applying the amplified output to the phase comparator 49, and indicating the output from the phase comparator 49 on the direction indicator 50.

With the antenna device of the second embodiment, the directivity of the point-symmetry, web-shaped antenna elements is rotated by the electronic switching unit, with the nondirectional antenna element is disposed substantially centrally in the web-shaped antenna elements, and the outputs from the web-shaped antenna elements and vertical antenna element are combined as they are in phase with each other or 90° out of phase with each other. When the outputs are combined in phase with each other, the amplitude of the high-frequency component is increased, and hence influences of high-frequency noise components are removed where the received wave is weak. Therefore, the direction in which a weak wave is received can accurately be detected. When a phase- or frequency-modulated wave signal is obtained by combining the outputs from the web-shaped antenna elements and vertical antenna element out of the phase with each other, accurate direction measurement can be carried out even in the case where the automatic gain control circuit of the amplifier does not function properly due to intermittent waves received.

Otherwise, when the antenna of direction finder is installed together with a communication transceiver antenna on roof of vehicle and direction finding is performed for same frequency range, the transceiver antenna gives severe interference for direction finding. To avoid its interference, it is very effective that the vertical antenna of this system is used as an antenna of the transceiver.

With the arrangement of the present invention, an antenna device has a plurality of antenna elements and an electronic switching circuit for rotating the directivity of the antenna device. The antenna device is capable of measuring the direction in which a wave is received without employing any mechanical rotating parts or mechanical changeover switches. The antenna device is therefore simple in construction, free of the danger of failures, and can easily be maintained. Since the outputs from the plurality of antenna devices are combined, the efficiency of wave reception is increased, and hence the measuring accuracy is increased. With the web-shaped antenna elements and vertical antenna element combined in the second embodiment, the antenna device can accurately measure the direction in which a weak or intermittent wave is received.

Although certain preferred embodiments have been shown and described, it should be understood that many changes and modifications may be made therein without departing from the scope of the appended claims.

What is claimed is:

1. An antenna device for a direction finder, comprising:
   (a) a substantially grounded conductive base plate including a conductive plate mounted on said base plate;
   (b) a plurality of web-shaped antenna elements mounted in spaced relation on said base plate and having central portions extending in crisscross relation and insulated from each other said web-shaped antenna elements having widths progressively increased toward their ends and spaced from said conductive plate by a distance progressively increased toward said ends of the antenna elements so that said antenna elements have substantially uniform characteristic impedances, said antenna elements being grounded through resistors having resistances substantially equal to the characteristic impedances thereof;
   (c) an electronic switching circuit for alternately grounding ends of said antenna elements and picking up reception outputs from opposite ends of said antenna elements at a constant period with said antenna elements being switched out of phase at an angle corresponding to the angle at which said antenna elements extend across each other; and
   (d) a circuit for combining outputs from said antenna elements.

2. An antenna device according to claim 1 including:
   (a) a vertical antenna element disposed substantially centrally in said web-shaped antenna elements; and (b) a circuit for combining an output from said web-shaped antenna elements and an output from said vertical antenna element in a certain phase relation.

3. An antenna device according to claim 2, wherein said circuit combines the outputs from said web-shaped and vertical antenna elements in phase with each other to produce an amplitude-modulated output.

4. An antenna device according to claim 2, wherein said circuit combines the outputs from said web-shaped and vertical antenna elements out of phase with each other to produce a phase- or frequency-modulated output.

* * * * *